(12) United States Patent
Taira (10) Patent No.: US 6,711,123 B1
(45) Date of Patent: Mar. 23, 2004

(54) RECEIVING APPARATUS FOR OFDM COMMUNICATION SYSTEM

(75) Inventor: Akinori Taira, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/494,555

(22) Filed: Jan. 31, 2000

(30) Foreign Application Priority Data

Feb. 15, 1999 (JP) .......................................... 11-036005

(51) Int. Cl.[7] ................................................ H04J 11/00
(52) U.S. Cl. ...................... 370/208; 370/206; 370/210; 370/480
(58) Field of Search ................................ 370/203–208, 370/335, 436, 210, 480

(56) References Cited

U.S. PATENT DOCUMENTS

| | | | | |
|---|---|---|---|---|
| 5,867,478 A | * | 2/1999 | Baum et al. | 370/203 |
| 5,920,598 A | * | 7/1999 | Hyakudai et al. | 375/316 |
| 6,125,124 A | * | 9/2000 | Junell et al. | 370/503 |
| 6,151,295 A | * | 11/2000 | Ma et al. | 370/203 |
| 6,449,245 B1 | * | 9/2002 | Ikeda et al. | 370/208 |

FOREIGN PATENT DOCUMENTS

| | | |
|---|---|---|
| JP | 8-265291 A | 10/1996 |
| JP | 2000-22657 A | 1/2000 |

OTHER PUBLICATIONS

Mochizuki, N., et al., "A High Performance Frequency and Timing Synchronization Technique for OFDM", The Institute of Electronics, Information and Communication Engineers, Technical Report of IEICE, SSE98–21, RCS98–21, Apr. 1998, pp. 75–82.

Onizawa, T., et al., "Generation preamble signals for fast OFDM synchronization", Information and Communication Engineers, 1998. p. 420 (with English translation).

* cited by examiner

Primary Examiner—Ricky Ngo
Assistant Examiner—Yvonne Q. Ha
(74) Attorney, Agent, or Firm—Rothwell, Figg, Ernst & Manbeck (57) ABSTRACT

In a receiving apparatus, which receiving apparatus performs timing synchronization in OFDM transmission by using specific known patterns included in a reception signal, a correlation value calculation unit calculates signal patterns identical to the specific known patterns, prepares the calculation result in the receiving apparatus beforehand, and performs correlation calculation between the reception signal and the signal patterns while shifting the position of the correlation calculation every specific time. A timing adjustment unit performs timing synchronization in the OFDM transmission by using a plurality of correlation values obtained by the correlation value calculation unit, a maximum correlation value searching unit, and a preceding wave searching unit.

10 Claims, 10 Drawing Sheets

RECEIVING APPARATUS FOR OFDM COMMUNICATION SYSTEM

FIELD OF THE INVENTION

The present invention relates to a receiving apparatus for an OFDM communication system used in mobile communication or the like. More particular, this invention relates to a receiving apparatus for performing timing synchronization on OFDM transmission by using specific known patterns included in a reception signal.

BACKGROUND OF THE INVENTION

A conventional receiving apparatus for an OFDM communication system will be explained below. For example, in wide-band mobile communication, arrival timing of a signal dynamically changes due to changes in the distances or the multi-path. In particular, since multi-carrier communication represented by OFDM (Orthogonal Frequency-Division Multiplexing) is sensitive to an error of reception timing, it is necessary to do some amends.

Figure 7:
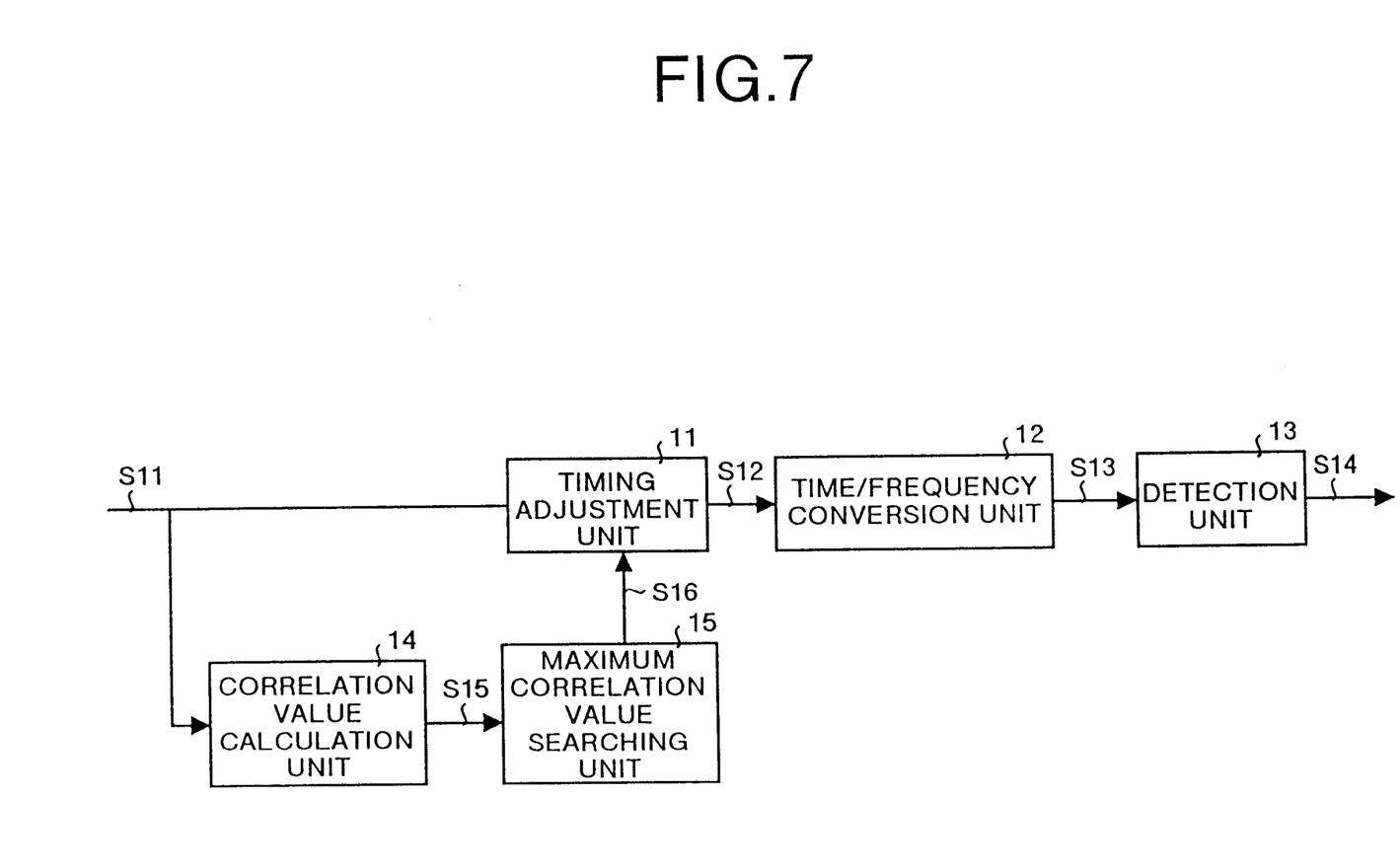
FIG. 7 is a block diagram showing the configuration of a receiver in a conventional mobile radio communication system.
Figure 8:
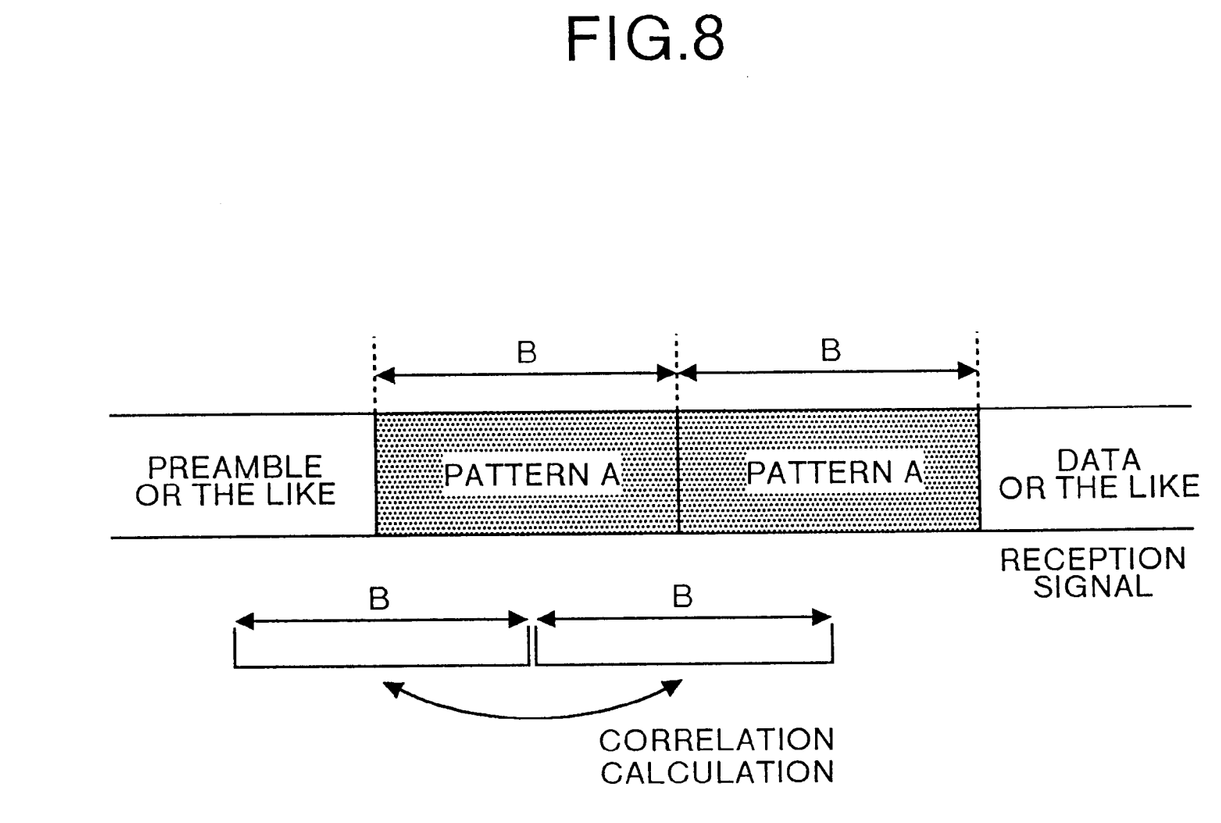
FIG. 8 is a diagram showing a burst format of an OFDM signal in a conventional art.

As literature related to the receiving apparatus for the OFDM communication system which performs some kind of compensations, for example, "A High Performance Frequency and Timing Synchronization Technique for OFDM, THE INSTITUTE OF ELECTRONICS, INFORMATION AND COMMUNICATION ENGINEERS, TECHNICAL REPORT OF IEICE., SSE98-21, RCS 98-21 (1998-04)" is known. The conventional art will be explained with reference to this literature. FIG. 7 is a block diagram showing the configuration of a receiving apparatus in a conventional mobile radio communication system. FIG. 8 shows a burst format of a conventional OFDM signal.

A reception signal (OFDM signal) S11 received by a receiver is input into a correlation calculation unit 14. In the reception signal S11, as shown in FIG. 8, subsequent to preamble written in a start portion of the burst, specific patterns each having a length B indicated by "pattern A" are repeatedly written (FIG. 8 shows a case in which the patterns are continuously written for two times). In the correlation calculation unit 14 into which the reception signal is input, the correlation value of the section of the continuous lengths B is calculated while shifting the calculation position. More specifically, while the calculation position is shifted at every predetermined time, correlation between the earlier "pattern A" and the later "pattern A" is taken a plurality of times, and correlation value distribution information S15 is output.

In a maximum correlation value searching unit 15, a position indicating the maximum correlation value is selected from the obtained correlation value distribution information S15, and maximum correlation value position information S16 is output. A timing adjustment unit 11 receives the reception signal S11 and the maximum correlation value position information S16. This timing adjustment unit 11 determines a start position of a data portion in the reception signal S11 based on the reception signal S11 and the maximum correlation value position information S16, and outputs a data signal S12 constituted by only the data portion to a time/frequency conversion unit 12.

Since the OFDM signal, i.e., the data signal S12 is multiplexed such that information is dispersed to a plurality of sub-carriers, the time/frequency conversion unit 12 converts the received data signal S12 from a signal on a time axis into a signal on a frequency axis, and information S13 on each sub-carrier is extracted. This extraction is performed using the FFT (Fast Fourier Transform).

Finally, the information S13 converted into data on each sub-carrier is transmitted to a detection unit 13. The detection unit 13 detects the information S13 and demodulates the information S13 to output reception information S14.

As described above, in the conventional receiving apparatus for an OFDM communication system, correlation between continuous repetitive patterns is used to detect a synchronization position, and a position where a reception signal having the maximum power is input in an ideal state being free from noise, i.e., a position indicating the maximum correlation value is estimated as the synchronization position.

Figure 9:
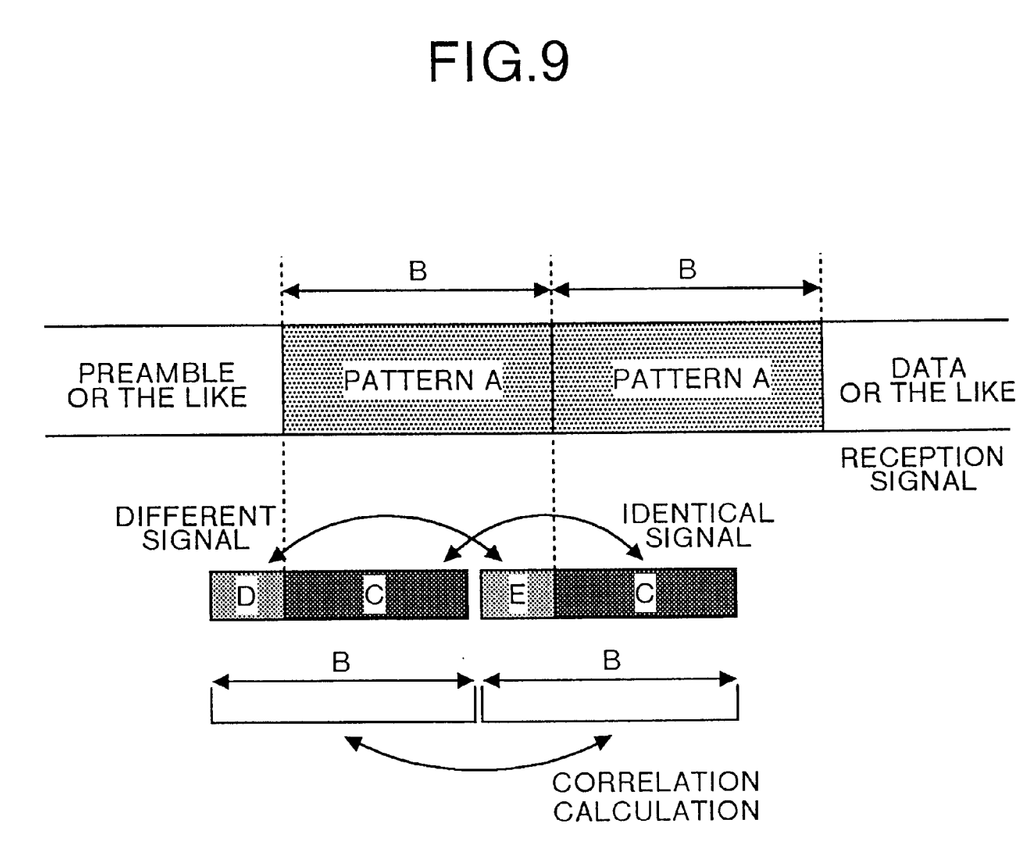
FIG. 9 is a diagram for explaining mutual correlation between known patterns.

However, in the conventional receiving apparatus for an OFDM communication system, since correlation between continuous repetitive patterns is used to detect a synchronization position, for example, as shown in FIG. 9, portions C in FIG. 9 are the same as each other, and portions D and E are different from each other. Thus, a difference between correlation values sometimes becomes very small. Therefore, a method of estimating a synchronization position based on correlation value distribution information obtained by the calculation method is very poor at noise in signal reception, and preferable synchronization characteristics cannot be obtained in an actual communication environment in which multi-path fading or the like occurs.

Figure 10:
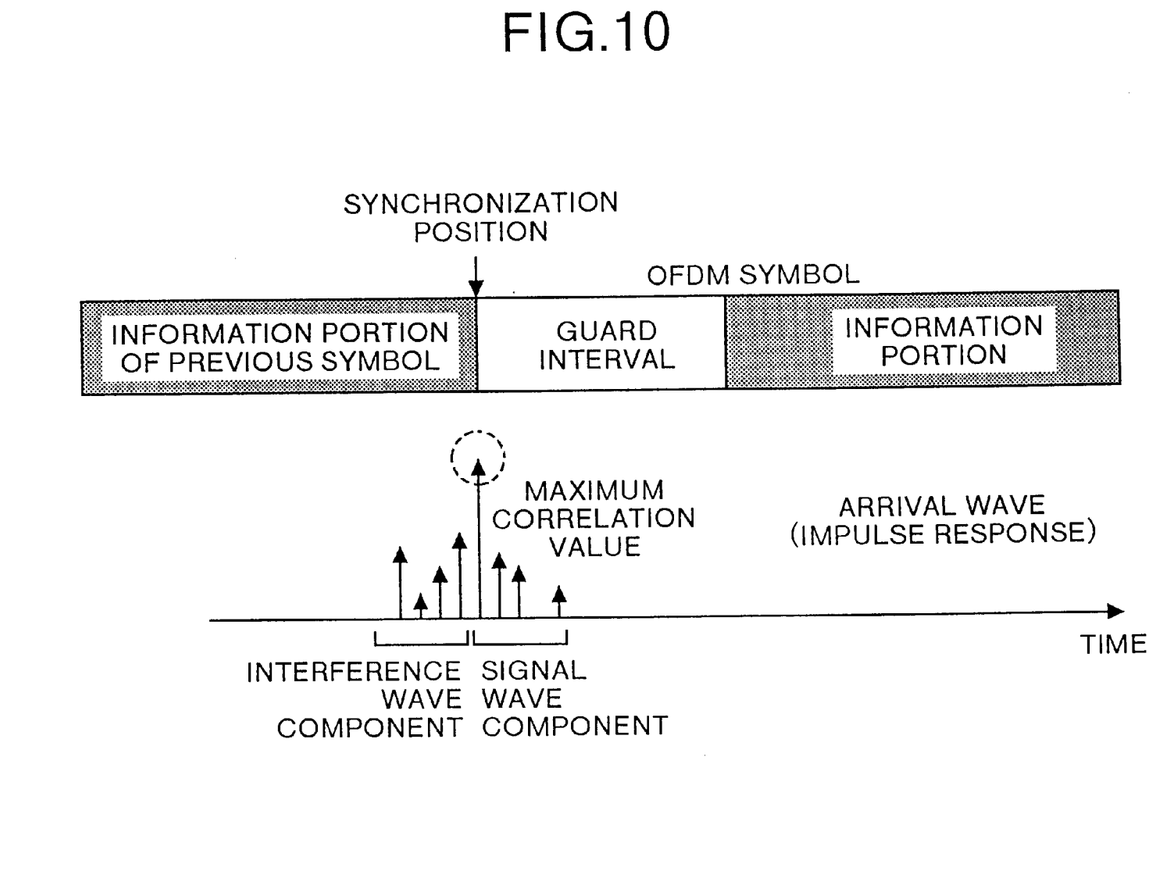
FIG. 10 is a diagram showing a method of estimating a synchronization position on a channel having the characteristic that the power of a delay wave is higher than that of a preceding wave.

In the conventional receiving apparatus for an OFDM communication system, as described above, a position where a reception signal having the maximum power is input is estimated as a synchronization position in an ideal state being free from noise. However, in an actual communication environment, it is unsure that the power of a preceding wave is always stronger than that of a delay wave. In general, in the OFDM communication system, as shown in FIG. 10, a redundant portion called a guard interval is formed ahead of the information portion. In the guard interval, the influence of interference caused by the delay wave is suppressed.

Therefore, although the influence of the delay wave in the guard interval is not very large, a received wave outside the guard interval serves as an interference component to adversely affect the operation of the OFDM communication system. Therefore, as shown in FIG. 10, in a channel having the characteristic that the power of a delay wave is higher than that of a preceding wave, a preceding wave (interference wave component) is arranged ahead of the guard interval, and the preceding wave degrades synchronization characteristics.

SUMMARY OF THE INVENTION

The present invention has been made in light of the problems described above. It is an object of the present invention to obtain a receiving apparatus which can obtain preferable synchronization characteristics even in a communication environment having high noise power.

According to one aspect of the present invention, unlike the conventional art where a correlation between continuous repetitive patterns is used to detect a synchronization position, the correlation between the continuous repetitive patterns is not used but signal patterns identical to specific known patterns are calculated. A calculation result is prepared in the apparatus in advance, and correlation calculation between a reception signal and the signal patterns is performed while shifting the position of the correlation calculation for every specific time. Further, a correlation value calculation unit for forming signal patterns identical to the known patterns in such a manner that an OFDM signal is converted from a frequency axis signal to a time axis signal is provided.

According to another aspect of the present invention, unlike the conventional art, a position where a reception signal having a maximum power (maximum correlation value) is input is not estimated as a synchronization position. For example, a intensity distribution of reception signals is calculated based on the plurality of obtained correlation values, a synchronization position where the power value of the reception signal arranged out of a guard interval is minimum is determined, and the synchronization position is set as a reference position of timing synchronization. In this manner, the maximum signal/interference wave power ratio can be realized for the reception wave, and preferable synchronization characteristics can be always obtained.

According to still another aspect of the present invention, unlike the conventional art where correlation between continuous repetitive patterns is used to detect a synchronization position, the correlation between the continuous repetitive patterns is not used but signal patterns identical to known specific multi-carrier time waveform pattern are calculated. A calculation result is prepared in the apparatus in advance, and correlation calculation between a multi-carrier time waveform pattern and the signal patterns is performed while shifting the position of the correlation calculation for every specific time. Further, a correlation value calculation unit for forming signal patterns identical to the multi-carrier time waveform pattern in such a manner that an OFDM signal is converted from a frequency axis signal to a time axis signal is provided.

Other objects and features of this invention will become apparent from the following description with reference to the accompanying drawings.

DESCRIPTION OF THE PREFERRED EMBODIMENTS

The embodiments of receiving apparatuses for OFDM communication systems according to the present invention will be explained below with reference to the accompanying drawings. Note that the present invention is not limited to these embodiments.

OFDM (Orthogonal Frequency-Division Multiplexing) communication is one of multi-carrier transmission schemes. In the OFDM communication, the frequency of each sub-carrier is set such that the carriers are orthogonal to each other. The information is transmitted in such a manner that the amplitudes, and phases of sub-carriers have constant values in the OFDM symbol period.

This transmission scheme has the following advantages. That is, this transmission scheme is strong to frequency selective fading, and can advantageously obtain a frequency diversity effect by using error correction coding. Further, unlike conventional multi-carrier transmission, the frequency intervals of the sub-channels can be finely set. Further, a guard interval is added to an OFDM symbol, so that the influence of inter-symbol interference can be reduced.

Figure 1:
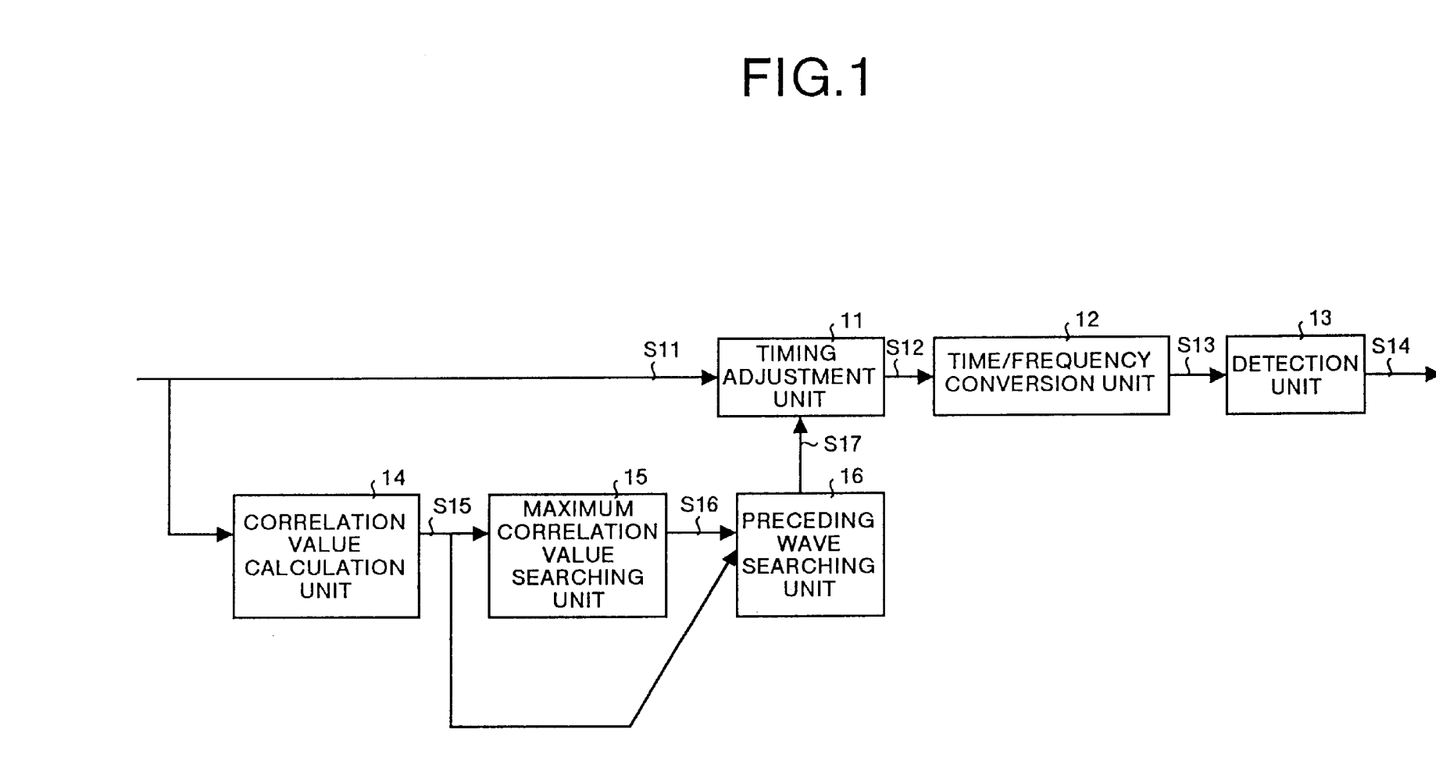
FIG. 1 is a block diagram showing the configuration of a receiving apparatus for an OFDM communication system according to a first embodiment.

FIG. 1 is a block diagram showing the configuration of a receiving apparatus for an OFDM communication system according to the present invention. In FIG. 1, reference numeral 14 denotes a correlation calculation unit for calculating correlation between a reception signal (OFDM signal) S11 and a unique pattern which is calculated and prepared beforehand to output correlation value distribution information S15; reference numeral 15 denotes a maximum correlation value searching unit for searching for the maximum correlation value from the correlation value distribution information S15 to generate maximum correlation value position information S16; reference numeral 16 denotes a preceding wave searching unit for searching for a plurality of reception waves on multi-path transmission from the correlation value distribution information S15 and the maximum correlation position information S16 to generate position information S17 which arrives at first; reference numeral 11 denotes a timing adjustment unit for fixing the position of a data portion in a reception signal S11 based on the position information S17 to output a data signal S12 serving as the data portion; reference numeral 12 denotes a time/frequency conversion unit for converting the data signal S12 from a signal on a time axis to a signal on a frequency axis (ordinary FFT process) to reproduce modulation signals S13 on sub-carriers; and reference numeral 13 denotes a detection unit for detecting the modulation signals S13 on the sub-carriers to demodulate reception information S14.

An operation of this receiving apparatus will be explained below. The reception signal S11 is input to the correlation calculation unit 14, and the correlation value distribution information S15 is calculated in the correlation calculation unit 14.

Figure 2:
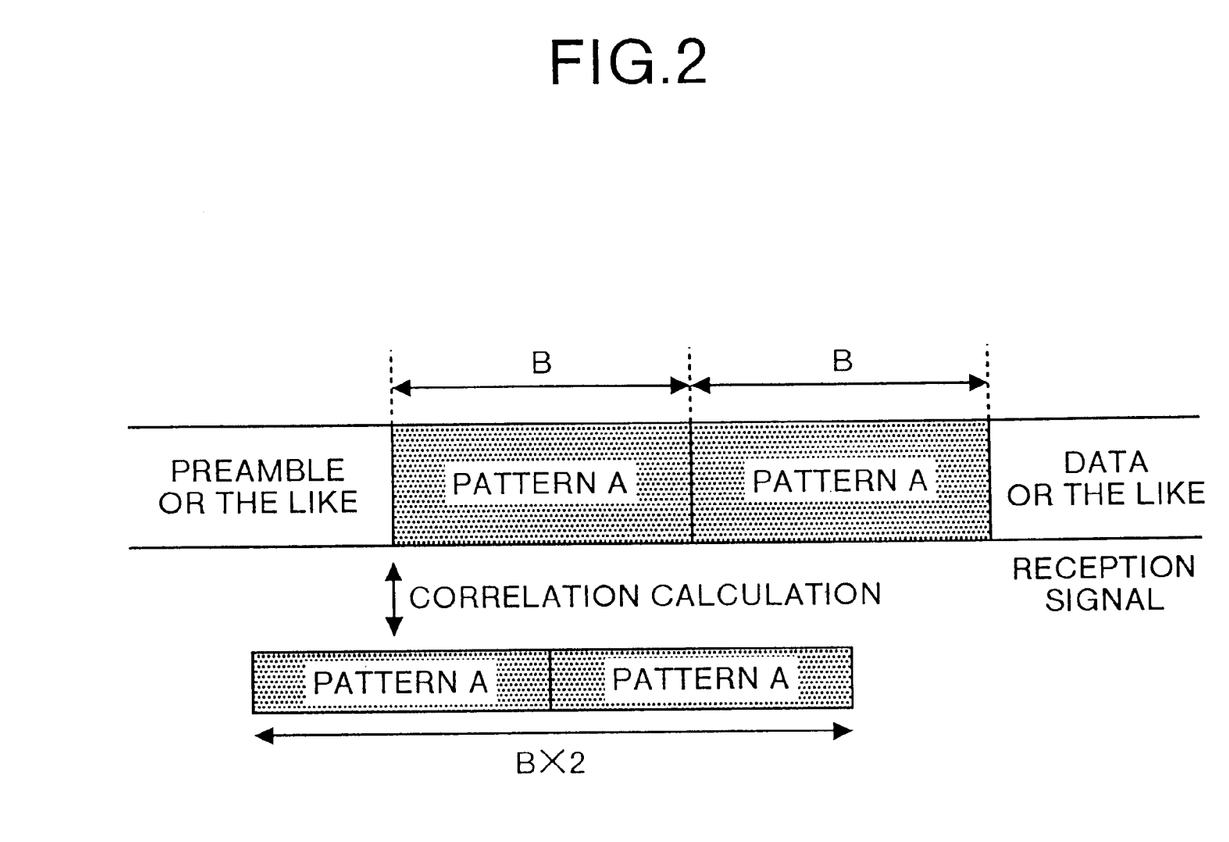
FIG. 2 is a diagram showing a method of calculating a correlation value.

FIG. 2 is a diagram showing a method of calculating the correlation. The burst format shown in FIG. 2 is the same as the conventional format described above. Since a pattern A is a known pattern, a time waveform of the pattern can be easily calculated and prepared beforehand (see the lower side of FIG. 2). For example, the OFDM signal is converted from a signal on a frequency axis to a signal on a time axis (IFFT process), so that the pattern A is generated.

In this embodiment, for example, the known pattern portion is set to be a unique word having a length of B×2. As explained above, a correlation value between the pattern A and a signal pattern (corresponding to two waveforms of the pattern A) which is prepared in advance. In this case, when the start position of correlation calculation is slightly shifted, the correlation value distribution information S15 is generated at each position. The maximum correlation value searching unit 15, which receives the correlation value distribution information S15, searches for a position where a correlation value is maximum from the information, and outputs the maximum correlation position information S16. The position in this information can be physically considered as the position of a (seeing relatively) input path having the maximum power.

The preceding wave searching unit 16, which receives the maximum correlation position information S16 and the correlation value distribution information S15, then performs a process of detecting a preceding wave on multi-path transmission.

Figure 3:
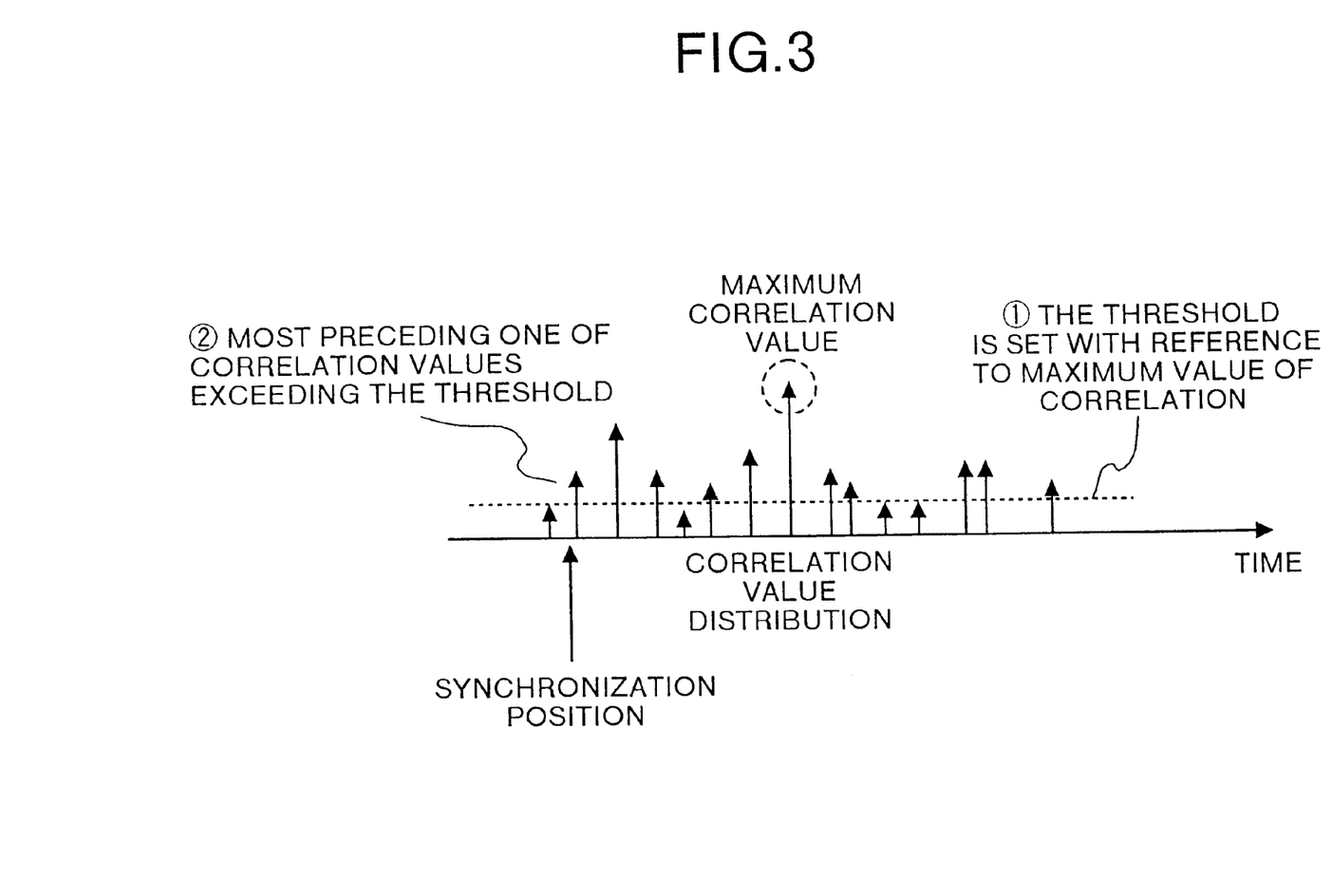
FIG. 3 is a diagram showing a preceding wave detection method in a preceding wave searching unit.

FIG. 3 is a diagram showing a preceding wave detection method in the preceding wave searching unit 16. The preceding wave searching unit 16 determines the maximum correlation position information S16 and a threshold serving as a reference of correlation value detection. More specifically, for example, the threshold is set to be 1/n (it is supposed that n is an arbitrary proper integer) of the maximum correlation value which is detected in beforehand.

An area extending from the maximum correlation value position detected in advance to the front is searched for positions each having a value which is equal to or larger than the threshold, and, of the positions, the position which is detected on the most preceding side is determined as a synchronization position. The information is output as the position information S17. The timing adjustment unit 11, which receives the position information S17, then determines a data portion in the reception signal S11 based on the position information S17, and outputs the data signal S12 of the data portion.

Since the information of the data signal S12 (OFDM signal) is dispersed into a plurality of sub-carriers to be multiplexed, the time/frequency conversion unit 12 converts the received data signal S12 from a signal on a time axis to a signal on a frequency axis, and extracts the modulation signal S13 as information on the sub-carriers. In this process, FFT is generally used.

The modulation signal S13 converted into data on the sub-carriers is transmitted to the detection unit 13. The detection unit 13 detects the modulation signal S13 and demodulates the modulation signal S13 to output the reception information S14.

In this manner, when the method is employed in a correlation value calculation process, if the position of correlation calculation is slightly shifted, completely different waveforms are recognized. Therefore, a very sharp peak of the correlation value can be detected at only a position where a reception wave exists.

In this embodiment, the pattern A is formed by converting the OFDM signal from a signal on a frequency axis to a signal on a time axis, and it is not considered that the reception signal S11 includes other known patterns. Therefore, a sharp correlation peak can be reliably obtained.

Although it depends on a method of setting a threshold in this embodiment, the possibility that a reception wave exists forward the synchronization position calculated by the above method is low. This means that an interference wave component arranged out of the guard interval becomes small in the OFDM communication. In this manner, an improvement in reception performance can be expected.

Figure 4:
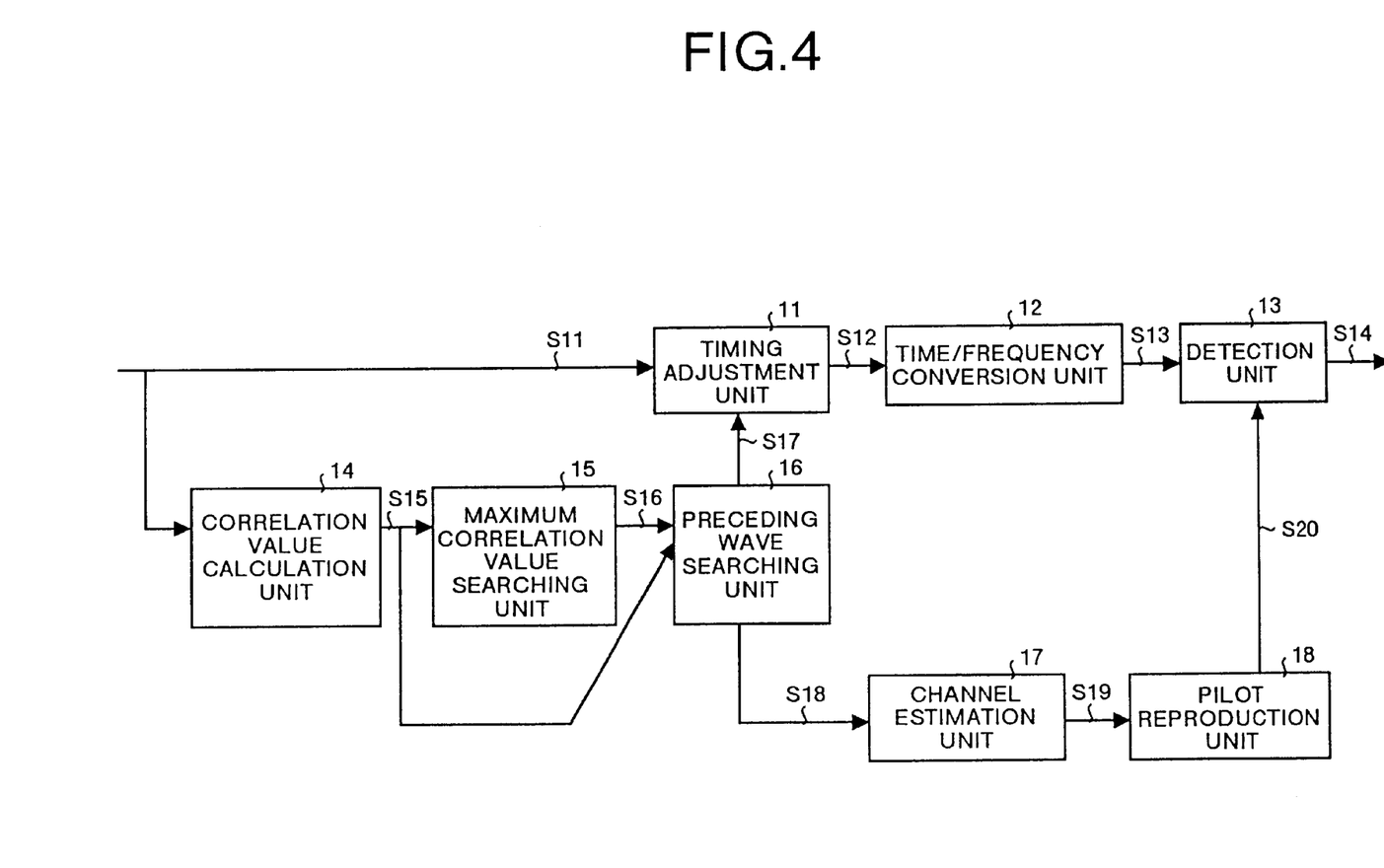
FIG. 4 is a block diagram showing the configuration of a receiving apparatus for an OFDM communication system according to a second embodiment.

FIG. 4 is a block diagram showing the configuration of a receiving apparatus for an OFDM communication system according to the present invention. The same sign is put on the element corresponding to each element in the first embodiment, and an explanation thereof will be omitted. In FIG. 4, information S18 is the information related to a correlation value including both the synchronization position information S17 and the correlation value distribution information S15 described above. Reference numeral 17 denotes a channel estimation unit for estimating a channel on a multi-path based on the information S18 related to the correlation value to generate channel information S19; and reference numeral 18 denotes a pilot reproduction unit for generating pilot signals S20 of respective carriers based on the channel information S19.

An operation of this receiving apparatus will be explained below. Since operations of a timing adjustment unit 11, a time/frequency conversion unit 12, a correlation calculation unit 14, and a maximum correlation value searching unit 15 are the same as those in the first embodiment, an explanation thereof will be omitted.

The synchronization position information S17 fixed by the preceding wave searching unit 16 is transmitted to the channel estimation unit 17 as the information S18 related to the correlation value together with the correlation value distribution information S15. The channel estimation unit 17, which receives the information S18, calculates the amplitudes (intensities), phase rotation amounts, delay times, and the like of the paths of a multi-path channel based on the information. These values are output as the channel information S19.

The pilot reproduction unit 18, which receives the channel information S19, calculates pilot signals on the carriers based on the information to output the pilot signals S20 serving as the calculation results. Based on the pilot signals, the detection unit 13 performs a detection process (coherent detection), and extracts reception information S14 from modulation signal S13.

In this manner, according to this embodiment, the pilot signals are generated by using the information (the amplitudes (intensities), phase rotation amounts, and delay times of the paths of the multi-path channel) used in a synchronization process. Therefore, a pilot reproduction process which is essential for coherent detection can be realized by a small amount of processing. Further, since channel estimation is performed by using the information S18 related to the correlation value, it is unnecessary to arrange a new pilot signal. Therefore, more efficient communication can be performed.

Figure 5:
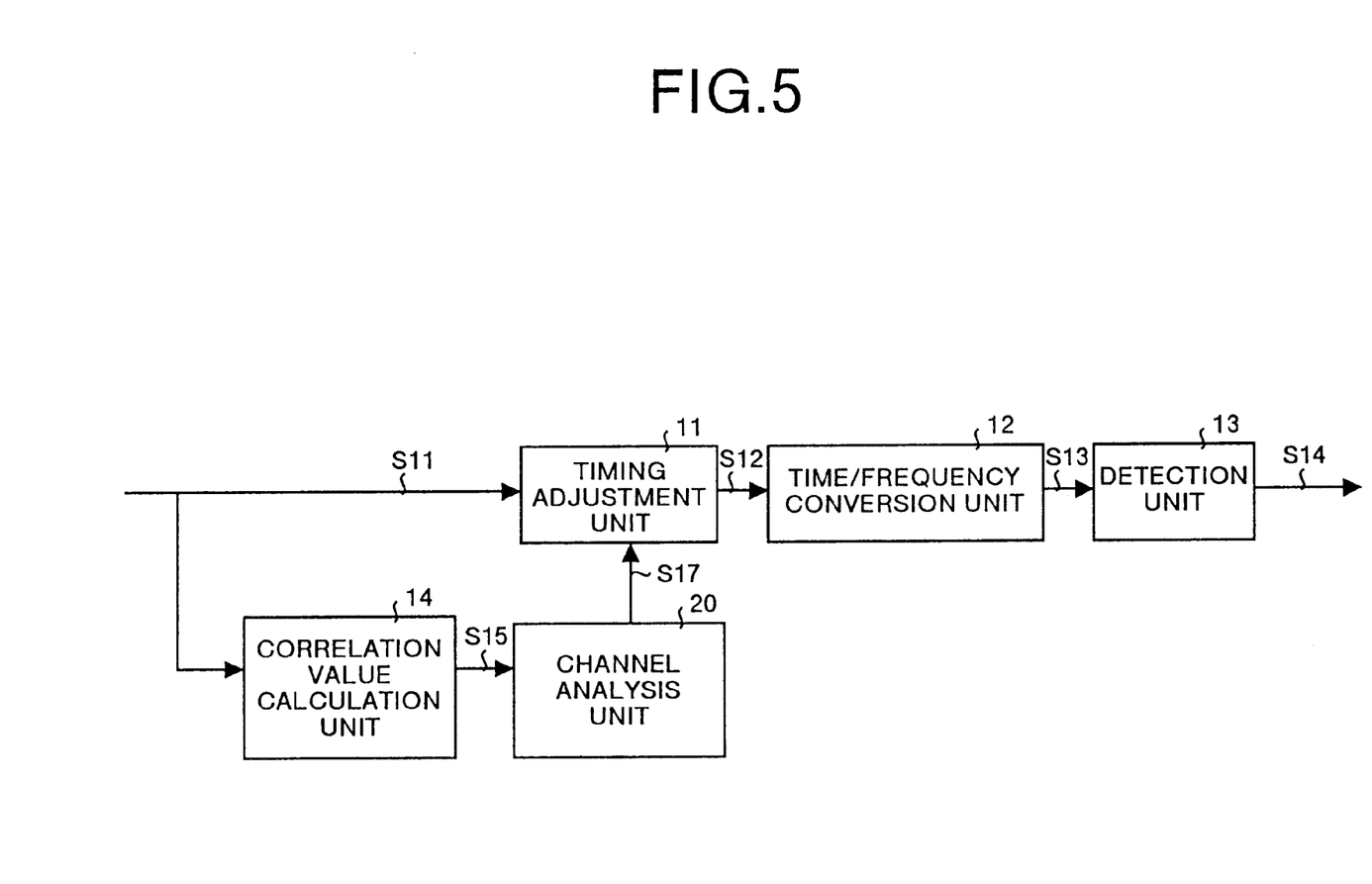
FIG. 5 is a block diagram showing an receiving apparatus for an OFDM communication system according to a third embodiment.

FIG. 5 is a block diagram showing the configuration of a receiving apparatus for an OFDM communication system according to third embodiment of the present invention. The same signs are provided to the sections that are same as those in the first and second embodiments, and to avoid the repetition, their explanation will be omitted.

In FIG. 5, reference numeral 20 denotes a channel analysis unit for calculating an intensity distribution of reception signals based on the obtained correlation value distribution information S15, determining a synchronization position where the power value of a reception signal arranged out of a guard interval is minimum, and outputting synchronization position information S17 as the synchronization position.

The first and second embodiments explained above are made on the assumption that all delay waves can be absorbed in guard intervals. However, the third embodiment will describe the case in which the distribution of reception waves extends in a wide range which is larger than a guard interval. When the distribution range of reception waves is larger than the guard interval, it is not always preferable that the reception wave position of a preceding wave is set as a synchronization position. Therefore, the configuration of this embodiment is necessary.

An operation of this receiving apparatus will be explained below. Since operations of a timing adjustment unit 11, a time/frequency conversion unit 12, and a correlation calculation unit 14 are the same as those in each of the first and second embodiments, so that their explanation will be omitted.

The channel analysis unit 20 calculates an intensity distribution of reception waves based on the obtained correlation value distribution information S15, and determines a synchronization position such that a signal power arranged out of a guard interval is minimum. The channel analysis unit 20 then outputs the synchronization position information S17.

In the receiving apparatus according to this embodiment, in general OFDM communication, as explained above, only a reception wave in the guard interval is regarded as a signal, and a reception wave out of the guard interval becomes an interference wave component. However, according to this embodiment, the synchronization position can be determined as explained above, and the maximum signal/interference wave power ratio can be realized for the reception waves. Therefore, the effect of the characteristic improvement according to the reduction of interference is achieved.

Figure 6:
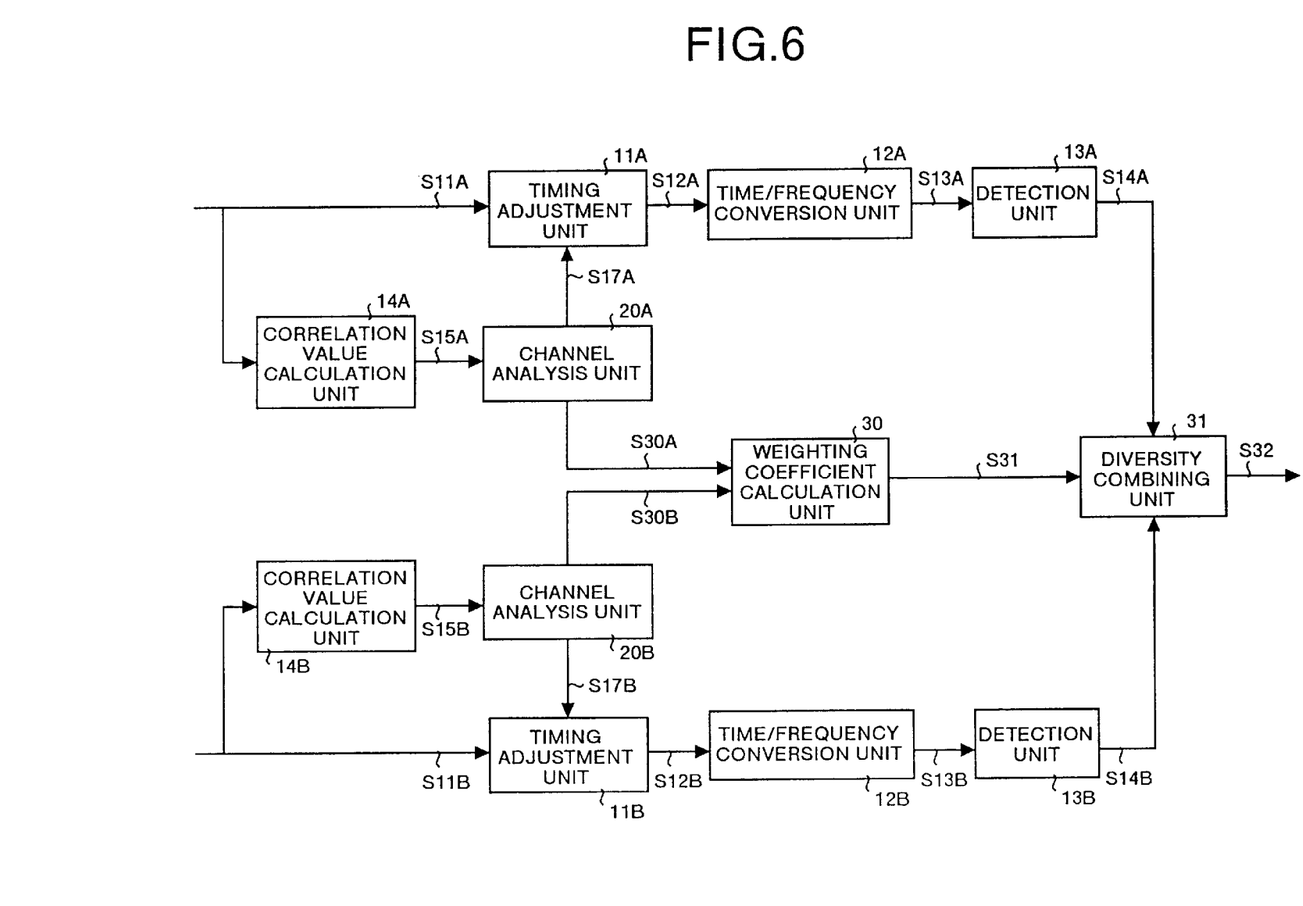
FIG. 6 is a block diagram showing an receiving apparatus for an OFDM communication system according to a fourth embodiment.

FIG. 6 is a block diagram showing the configuration of a receiving apparatus for an OFDM communication system according to the present invention. The same sign is put on the element corresponding to each element in the first to third embodiments, and an explanation thereof will be omitted. Since the configuration of this embodiment includes two systems each constituted by the configuration of the third embodiment, A and B of the alphabet have been applied to each sign.

In FIG. 6, reference symbols S30A and S30B are pieces of signal/interference wave power ratio information output from channel analysis units; reference numeral 30 denotes a weighting coefficient calculation unit for calculating weighting coefficient information S31 for diversity combining based on the pieces of signal/interference wave power ratio information S30A and S30B; and reference numeral 31 denotes a diversity combining unit for weighting pieces of reception information S14A and S14B from two branches by the weighting coefficient information S31 to combining the pieces of reception information S14A and S14B and outputting reception information S32 after combining.

An operation of this receiving apparatus will be explained below. Since operations of timing adjustment units 11A and 11B, time/frequency conversion units 12A and 12B, and correlation value calculation units 14A and 14B are the same as those in the first, second and third embodiments, an explanation thereof will be omitted. Also, operations of branches are the same as those in the third embodiment.

Channel analysis units 20A and 20B, which receive pieces of correlation value distribution information S15A and S15B, respectively, together with pieces of synchronization position information S17A and S17B, outputs a ratio of the power of a reception wave falling within a guard interval to the power of a reception wave arranged out of the guard interval, i.e., the pieces of signal/interference wave power ratio information S30A and S30B.

The weighting coefficient calculation unit 30, which receives the pieces of signal/interference wave power ratio information, determines weighting coefficients required when two branches are combined with each other, and then outputs the weighting coefficient information S31. Thereafter, when the pieces of reception information S14A and S14B of the branches are transmitted to the diversity combining unit 31, the diversity combining unit 31 weights the pieces of reception information S14A and S14B based on the weighting coefficient information S31, combines the pieces of reception information S14A and S14B with each other, and then outputs the reception information S32.

In this manner, according to this embodiment, since the ratio of the power serving as a signal component to the power serving as an interference component is apparent by each channel analysis unit, the reliability of reception information generated by each branch is improved. Further, if the branch combining is executed by using the pieces of signal/interference wave power ratio information S30A and S30B, more effective diversity reception can be expected. When a weighting coefficient is to be determined, in addition to the signal/interference power ratio, other reliability information, e.g., the absolute magnitude of reception power or the like may be used. In this embodiment, two branches of diversity are constituted for descriptive convenience. However, the present invention is not essentially limited to the embodiment, and three or more branches of diversity may be constituted as needed.

As explained above, according to one aspect of the present invention, signal patterns identical to specific known patterns are calculated, the calculation result is prepared in the apparatus in advance, and correlation calculation between a reception signal and the signal patterns is performed while shifting the position of the correlation calculation for every specific time. In this manner, when the position of correlation calculation is slightly shifted, completely different waveforms are recognized. Therefore, there is obtained an effect that a very sharp peak of the correlation value can be detected at a position where a reception wave exists. More specifically, the receiving apparatus is extremely strong in noise in signal reception, and can obtain preferable synchronization characteristics even in an actual communication environment in which multi-path fading or the like occurs. In addition, in the correlation value calculation unit, signal patterns identical to the known patterns are formed such that an OFDM signal is converted from a frequency axis signal to a time axis signal. Therefore, it is considered that a repetitive waveform is not included in the pattern, and there is obtained an effect that a sharp correlation peak can be reliably obtained.

Further, unlike the conventional art, a position where a reception signal having the maximum power (maximum correlation value) is input is not estimated as a synchronization position. For example, 1/n (n is an arbitrary integer) of the obtained maximum correlation value is set as a predetermined threshold, and the most preceding position of a correlation value which is not less than the threshold is set as a reference position of timing synchronization. In this manner, a reception wave power falling within a guard interval can be made maximum. In addition, even in a channel having the characteristic that the power of a delay wave is higher than that of a preceding wave, a preceding wave (interference wave component) is not arranged ahead of the guard interval, and preferable synchronization characteristics can be obtained.

Further, preferable synchronization characteristics can be always obtained by a timing adjustment unit. Therefore, a data portion of the reception signal can be precisely estimated.

Further, the data portion of the reception signal is converted from a signal on the time axis to a signal on the frequency axis by an FFT process, and reproduced modulation signals on sub-carriers are detected by a detection unit and then demodulated. In this manner, highly reliable reception information can be supplied to a subsequent circuit.

Further, a channel information representing an amplitudes, phase rotation amounts, and delay times of the paths of a multi-path channel is estimated based on the reference position information and the plurality of correlation values, and a pilot signal is calculated based on the information. In this manner, the pilot signal can be generated by the information used in a synchronization process, and a pilot reproduction process which is essential for coherent detection can be realized by a small amount of processing. In addition, in the aspect, since channel estimation is performed by information received from a preceding wave searching unit, a new pilot signal need not be arranged by a detection unit, and efficient communication can be performed.

According to another aspect of the present invention, signal patterns identical to specific known patterns are calculated. A calculation result is prepared in the apparatus in advance, and correlation calculation between a reception signal and a signal patterns is performed while shifting the position of the correlation calculation every specific time. In this manner, when the position of the correlation calculation is slightly shifted, completely different waveforms are recognized. Therefore, there is obtained an effect that a very sharp peak of the correlation value can be detected at a position where a reception wave exists. More specifically, the receiving apparatus is extremely strong in noise in signal reception, and can obtain preferable synchronization characteristics even in an actual communication environment in which multi-path fading or the like occurs. In addition, unlike the conventional art, a position where a reception signal having a maximum power (maximum correlation value) is input is not estimated as a synchronization position. For example, a intensity distribution of reception signals is calculated based on the plurality of obtained correlation values, a synchronization position where the power value of the reception signal arranged out of a guard interval is minimum is determined, and the synchronization position is set as a reference position of timing synchronization. In this manner, the maximum signal/interference wave power ratio can be realized for the reception wave, and there is obtained an effect that a preferable synchronization characteristics can be always obtained.

Further, preferable synchronization characteristics can be always obtained by a timing adjustment unit. Therefore, a data portion of the reception signal can be precisely estimated.

Further, the data portion of the reception signal is converted from a signal on the time axis to a signal on the frequency axis by an FFT process, and reproduced modulation signals on sub-carriers are detected by a detection unit and then demodulated. In this manner, highly reliable reception information can be supplied to a subsequent circuit.

Further, a channel analysis unit of each system outputs information of the ratio of a power value of the reception signal arranged in a guard interval to the power value of a reception signal arranged out of the guard interval and serving as an interference wave. A weighting coefficient is calculated based on the information. Outputs from a detection unit of respective systems then are weighted based on this weighting coefficient. Thereafter, diversity combining is performed. In this manner, a ratio of the power serving as a signal component to the power serving as an interference component is apparent, and the reliability of the reception information generated by each of the systems is improved. The diversity combining is executed by using the information of the ratio of the power serving as a signal component to the power serving as an interference component, so that more effective diversity reception can be expected.

According to still another aspect of the present invention, signal patterns identical to known specific multi-carrier time waveform pattern are calculated. A calculation result is prepared in the apparatus in advance, and correlation calculation between a multi-carrier time waveform pattern and the signal patterns is performed while shifting the position of the correlation calculation for every specific time.

In this manner, when the position of correlation calculation is slightly shifted, completely different waveforms are recognized. Therefore, there is obtained an effect that a very sharp peak of the correlation value can be detected at a position where a reception wave exists. More specifically, the receiving apparatus is extremely strong in noise in signal reception, and can obtain preferable synchronization characteristics even in an actual communication environment in which multi-path fading or the like occurs. In addition, in the correlation value calculation unit, signal patterns identical to the known patterns are formed such that an OFDM signal is converted from a frequency axis signal to a time axis signal. Therefore, it is considered that a repetitive waveform is not included in the pattern, and there is obtained an effect that a sharp correlation peak can be reliably obtained.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A receiving apparatus for performing timing synchronization in OFDM transmission by using specific known patterns included in a reception signal, said receiving apparatus comprising:
   a correlation value calculation unit for calculating signal patterns identical to the specific known patterns, preparing the calculation result in said receiving apparatus before performing a correlation calculation, and performing correlation calculation between the reception signal and the signal patterns at a plurality of positions of the correlation calculation each shifted by a specific symbol time interval, to obtain a plurality of correlation values; and
   a timing synchronization processing unit for performing timing synchronization on the OFDM transmission by using said plurality of correlation values obtained by said correlation value calculation unit.

2. The receiving apparatus according to claim 1, wherein said timing synchronization processing unit comprises:
   a maximum correlation value searching unit for searching for the position of the maximum correlation value based on the plurality of obtained correlation values;
   a preceding wave searching unit for determining a specific threshold based on the maximum correlation value and outputting the most preceding position of a correlation value which is not less than the threshold as reference position information of the timing synchronization; and
   a timing adjustment unit for performing timing synchronization on the OFDM transmission based on the reference position information.

3. The receiving apparatus according to claim 2, wherein said timing adjustment unit further determines, based on the reference position information, a data portion of the reception signal which dynamically changes by the effects of a distance deviation or a multi-path to output the data portion.

4. The receiving apparatus according to claim 3, further comprising:

a time/frequency conversion unit for converting the data portion from a signal on a time axis to a signal on a frequency axis to reproduce modulation signals on sub-carriers; and a detection unit for detecting and demodulating the modulation signals on the sub-carriers.

5. The receiving apparatus according to claim 2, further comprising:

a channel estimation unit for estimating channel information representing the amplitudes, phase rotation amounts, and delay times of paths of a multi-path channel based on the reference position information and the plurality of correlation values obtained by the correlation value calculation unit; and a pilot generation unit for calculating a pilot signal based on the channel information, wherein a coherent detection process is performed based on the pilot signal.

6. A receiving apparatus for performing timing synchronization in OFDM transmission by using specific known patterns included in a reception signal, said receiving apparatus comprising:

a correlation value calculation unit for calculating signal patterns identical to the specific known patterns, preparing the calculation result in said receiving apparatus before performing a correlation calculation, and performing correlation calculation between the reception signal and the signal patterns at a plurality of positions of the correlation calculation each shifted by a specific symbol time interval, to obtain a plurality of correlation values;

a channel analysis unit for calculating an intensity distribution of reception signals based on the plurality of obtained correlation values, determining a synchronization position where the power value of the reception signal arranged out of a guard interval is minimum, and outputting the synchronization position as reference position information of timing synchronization; and a timing adjustment unit for performing timing synchronization on the OFDM transmission based on the reference position Information.

7. The receiving apparatus according to claim 6, wherein the timing adjustment unit further determines, based on the reference position information, a data portion of the reception signal which dynamically changes by the effects of a distance deviation or a multi-path to output the data portion.

8. The receiving apparatus according to claim 7, further comprising:

a time/frequency conversion unit for converting the data portion from a signal on a time axis to a signal on a frequency axis to reproduce modulation signals on sub-carriers; and a detection unit for detecting and demodulating the modulation signals on the sub-carriers.

9. The receiving apparatus according to claim 8, which includes a plurality of systems each obtained by combining said correlation value calculation unit, said channel analysis unit, said timing adjustment unit, said time/frequency conversion unit, and said detection unit to each other, so that diversity reception is performed, and in which said channel analysis unit of each branch outputs information of a ratio of the power value of a reception signal arranged in a guard interval to the power value of a reception signal arranged out of said guard interval and serving as an interference wave, said receiving apparatus further comprising:

a weighting coefficient calculation unit for calculating a weighting coefficient based on the ratio obtained by said channel analysis unit of each branch; and a diversity combining unit for weighting outputs from said detection unit of the respective systems based on the weighting coefficient to perform diversity combining.

10. A receiving apparatus for performing timing synchronization in OFDM transmission by using a specific multi-carrier time waveform pattern included in a reception signal, said receiving apparatus comprising:

a correlation value calculation unit for calculating a signal waveform identical to the specific multi-carrier time waveform pattern, preparing the calculation result in said receiving apparatus before performing a correlation calculation, and performing correlation calculation between the reception signal and the signal waveform at a plurality of positions of the correlation calculation each shifted by a specific symbol time interval, to obtain a plurality of correlation values; and a timing synchronization processing unit for performing timing synchronization on the OFDM transmission by using said plurality of correlation values obtained by said correlation value calculation unit.

* * * * *